United States Patent
Furukawa et al.

(10) Patent No.: US 7,138,467 B2
(45) Date of Patent: Nov. 21, 2006

(54) SILICONE RESIN COMPOSITION, CURABLE RESIN COMPOSITION, AND CURABLE RESIN

(75) Inventors: Haruhiko Furukawa, Chiba (JP); Koji Nakanishi, Chiba (JP); Yoshitsugu Morita, Chiba (JP); Hiroshi Ueki, Chiba (JP)

(73) Assignee: Dow Corning Toray Silicon Co., Lt., Tokyo (JP)

( * ) Notice: Subject to any disclaimer, the term of this patent is extended or adjusted under 35 U.S.C. 154(b) by 182 days.

(21) Appl. No.: 10/504,338

(22) PCT Filed: Feb. 14, 2003

(86) PCT No.: PCT/JP03/01608

§ 371 (c)(1),
(2), (4) Date: Aug. 11, 2004

(87) PCT Pub. No.: WO03/072656

PCT Pub. Date: Sep. 4, 2003

(65) Prior Publication Data

US 2005/0080204 A1   Apr. 14, 2005

(30) Foreign Application Priority Data

Feb. 28, 2002   (JP) ............................. 2002-054544

(51) Int. Cl.
*C08L 63/00* (2006.01)

(52) U.S. Cl. .................................................. 525/476
(58) Field of Classification Search ................. 525/476
See application file for complete search history.

(56) References Cited

U.S. PATENT DOCUMENTS 5,952,439 A * 9/1999 Morita et al. ............... 525/476

FOREIGN PATENT DOCUMENTS

| JP | HEI 6-298897 | 10/1994 |
| JP | HEI 11-222559 | 8/1999 |
| JP | HEI 11- 323086 | 11/1999 |

* cited by examiner

Primary Examiner—Margaret G. Moore
(74) Attorney, Agent, or Firm—Howard & Howard Attorneys, P.C.

(57) ABSTRACT

The present invention relates to a silicone resin composition of low melt viscosity and excellent reactivity and dispersibility in organic resins. The present invention also relates to a curable resin composition for forming a cured resin of excellent moldability and superior flame retardant properties while having little adverse impact on the human body and the environment as a result of containing no antimony oxides or halogenated epoxy resins. The present invention also relates to a cured resin having little adverse impact on the human body or the environment and possessing superior flame retardant properties.

24 Claims, No Drawings

SILICONE RESIN COMPOSITION, CURABLE RESIN COMPOSITION, AND CURABLE RESIN

TECHNICAL FIELD

The present invention relates to a silicone resin composition of low melt viscosity and excellent reactivity and dispersibility in organic resins. The present invention also relates to a curable resin composition for forming a cured resin of excellent moldability and superior flame retardant properties while having little adverse impact on the human body and the environment as a result of containing no antimony oxides or halogenated epoxy resins. The present invention also relates to a cured resin having little adverse impact on the human body or the environment and possessing superior flame retardant properties.

BACKGROUND ART

As disclosed in Japanese Unexamined Patent Application Publication No. Hei 6-298940, it is possible to prepare silicone resins having any arbitrary molecular weight, softening point, or glass transition points depending on the reaction conditions and the combination of siloxanes or silanes used as the starting materials, however, regulating their melt viscosity and their reactivity and dispersibility in mixtures with organic resins has been a tough problem.

On the other hand, although curable resin compositions can produce cured resin of superior dielectric characteristics, volume resistivity, dielectric breakdown strength, and other electrical characteristics, as well as flexural strength, compression strength, impact strength, and other mechanical characteristics, in order to improve their flame retardant properties, they have to be combined with halogen-containing compounds and antimony oxides, such as antimony trioxide, which gives cause for concern with respect to their impact on the human body and the environment due to the toxicity of the antimony oxide powders and the toxic gases released during the burning of the resultant cured resins.

In accordance with the teachings of Japanese Unexamined Patent Application Publication No. Hei 6-298897, combining silicone resins with curable resins improves pre-curing flowability and provides for better flexibility, moisture resistance, and resistance to thermal shock. In addition, in accordance with the teachings of Japanese Unexamined Patent Application Publication No. Hei 11-222559 and Japanese Unexamined Patent Application Publication No. Hei 11-323086, etc., combining silicone resins with curable resins improves the flame retardant properties of the cured resin. However, the problem with the curable resin composition disclosed in Japanese Unexamined Patent Application Publication No. Hei 6-298897 was the insufficient flame retardant properties of the resultant cured resin. The problem with the curable resin compositions disclosed in Japanese Unexamined Patent Application Publication No. Hei 11-222559 and Japanese Unexamined Patent Application Publication No. Hei 11-323086 was poor moldability causing mold contamination during molding, etc.

It is an object of the present invention to provide a silicone resin composition of low melt viscosity and excellent reactivity and dispersibility in organic resins, a curable resin composition forming a cured resin of excellent moldability and superior flame retardant properties and having little adverse impact on the human body and the environment as a result of containing no antimony oxides or halogenated epoxy resins, as well as a cured resin having little adverse impact on the human body or the environment and possessing superior flame retardant properties.

DISCLOSURE OF INVENTION

One embodiment of the present invention comprises a silicone resin composition comprising (A) a silicone resin with a softening point exceeding 25° C., and (B) a silicone resin that is liquid at 25° C. Other embodiments of the present invention include a curable resin comprising: (I) a curable resin, (II) a silicone resin with a softening point exceeding 25° C., and (III) a silicone resin that is liquid at 25° C. and the cured resin obtained by curing the above-mentioned curable resin composition.

One embodiment of the present invention is a silicone resin composition comprising:
(A) a silicone resin with a softening point exceeding 25° C., represented by the average unit formula:

$$(R^1SiO_{3/2})_a(R^2{}_2SiO_{2/2})_b(R^3{}_3SiO_{1/2})_c(SiO_{4/2})_d(XO_{1/2})_e$$

where $R^1$, $R^2$, and $R^3$ stand for identical or different monovalent hydrocarbon groups or epoxy-containing organic groups such that, of the total number of $R^1$, $R^2$, and $R^3$ groups in the molecule, 0.1 to 40 mol % comprises epoxy-containing organic groups and not less than 10 mol % comprises phenyl groups, X is a hydrogen atom or alkyl group, a is a positive number, b is 0 or a positive number, c is 0 or a positive number, d is 0 or a positive number, and e is 0 or a positive number such that b/a is a number from 0 to 10, c/a is a number from 0 to 0.5, d/(a+b+c+d) is a number from 0 to 0.3, and e/(a+b+c+d) is a number from 0 to 0.4, and
(B) a silicone resin that is liquid at 25° C.

DETAILED DESCRIPTION OF THE INVENTION

Component (A) is a silicone resin with a softening point exceeding 25° C., represented by the average unit formula $(R^1SiO_{3/2})_a(R^2{}_2SiO_{2/2})_b(R^3{}_3SiO_{1/2})_c(SiO_{4/2})_d(XO_{1/2})_e$. In the formula above, $R^1$, $R^2$, and $R^3$ stand for identical or different monovalent hydrocarbon groups or epoxy-containing organic groups. The monovalent hydrocarbon groups are exemplified by methyl, ethyl, propyl, butyl, pentyl, hexyl, heptyl, and other alkyl groups; vinyl, allyl, butenyl, heptenyl, hexenyl, and other alkenyl groups; phenyl, tolyl, xylyl, naphthyl, and other aryl groups; benzyl, phenetyl, and other aralkyl groups; chloromethyl, 3-chloropropyl, 3,3,3-trifluoropropyl, nonafluorobutylethyl, and other substituted alkyl groups. In addition, the epoxy-containing organic groups are exemplified by 2,3-epoxypropyl, 3,4-epoxybutyl, 4,5-epoxypentyl, and other epoxyalkyl groups; 2-glycidoxyethyl, 3-glycidoxypropyl, 4-glycidoxybutyl, and other glycidoxyalkyl groups; 2-(3,4-epoxycyclohexyl)ethyl, 3-(3,4-epoxycyclohexyl)propyl, and other epoxycyclohexylalkyl groups.

Of the total number of $R^1$, $R^2$, and $R^3$ groups in the molecule, 0.1 to 40 mol % comprises epoxy-containing organic groups. This is due to the fact that when the content of the epoxy-containing organic groups is below the lower end of the above-mentioned range, combining the resultant silicone resin composition with organic resins results in bleeding during the molding of the organic resin composition and the flexibility, moisture resistance, and thermal shock resistance of the obtained moldings have a tendency to decrease while, on the other hand, when the content exceeds the upper end of the above-mentioned range, the mechanical characteristics of the resultant moldings tend to decrease.

In addition, due to their superior affinity for organic resins, not less than 10 mol % of the total number of $R^1$, $R^2$, and $R^3$ groups comprise phenyl groups. In particular, preferably, phenyl groups should comprise not less than 10 mol % of $R^1$, and even more preferably, phenyl groups should comprise not less than 30 mol % of $R^1$.

In the formula above, X stands for a hydrogen atom or alkyl groups, with the alkyl groups exemplified by methyl, ethyl, propyl, butyl, pentyl, hexyl, and heptyl.

In the formula above, subscript a is a positive number, subscript b is 0 or a positive number, subscript c is 0 or a positive number, subscript d is 0 or a positive number, and subscript e is 0 or a positive number such that b/a is a number from 0 to 10, c/a is a number from 0 to 0.5, d/(a+b+c+d) is a number from 0 to 0.3, and e/(a+b+c+d) is a number from 0 to 0.4. This is due to the fact that the softening point of a silicone resin with ab/a exceeding 10 may drop below 25° C. and its affinity for organic resins may also decrease. In addition, a silicone resin with a c/(a+b+c) exceeding 0.3 has a tendency toward decreased dispersibility in organic resins.

There are no limitations concerning the weight-average molecular weight of component (A). Preferably, however, it should be in the range of from 500 to 50,000, and more preferably, in the range of from 500 to 10,000. In addition, although there are no particular limitations if the softening point of component (A) exceeds 25° C., preferably, it should be in the range of from 40 to 250° C. and more preferably, in the range of from 40 to 150° C. This is due to the fact that silicone resin with a softening point below the lower end of the range bleeds during the molding of the organic resin, with which it is combined, thereby contaminating the mold, and tends to decrease the mechanical characteristics of the moldings. On the other hand, silicone resin with a softening point exceeding the upper end of the range exhibits a tendency towards increased difficulty of uniform dispersion in organic resins.

Although there are no limitations concerning the method used for the preparation of the silicone resin of component (A), it is preferable to use a method, in which a mixture of one, two, or more siloxanes or silanes having at least one unit selected from the group comprising (A') (i) units represented by the formula $R^4SiO_{3/2}$, where $R^4$ is a monovalent hydrocarbon group, (ii) units represented by the formula $R^5_2SiO_{2/2}$, where $R^5$ stands for identical or different monovalent hydrocarbon groups, (iii) units represented by the formula $R^6_3SiO_{1/2}$, where $R^6$ stands for identical or different monovalent hydrocarbon groups, and (iv) units represented by the formula $SiO_{4/2}$ is reacted with (A") an epoxy-containing alkoxysilane, or a partial hydrolysis product thereof, represented by the general formula: $R^7R^8_fSi(OR^9)_{(3-f)}$, where $R^7$ is an epoxy-containing organic group, $R^8$ is a monovalent hydrocarbon group, $R^9$ is an alkyl group, and subscript f is 0, 1, or 2, in the presence of a basic catalyst.

In the above-described method of preparation, component (A') is the primary raw material, i.e. a mixture of one, two, or more siloxanes or silanes having at least one unit selected from the group comprising units represented by the formulas (i)–(iv) above. Component (A') is exemplified by siloxanes or silanes consisting only of the units represented by (i), siloxanes or silanes consisting only of the units represented by (ii), siloxanes or silanes consisting only of the units represented by (iii), siloxanes or silanes consisting only of the units represented by (iv), siloxanes consisting of units represented by (i) and units represented by (ii), siloxanes consisting of units represented by (i) and units represented by (iii), siloxanes consisting of units represented by (i) and units represented by (iv), siloxanes consisting of units represented by (i), units represented by (ii), and units represented by (iii), siloxanes consisting of units represented by (i), units represented by (ii), and units represented by (iv), and siloxanes consisting of units represented by (i), units represented by (ii), units represented by (iii), and units represented by (iv). In addition, $R^4$, $R^5$, and $R^6$ in the formula above are identical or different monovalent hydrocarbon groups, exemplified by the same monovalent hydrocarbon groups as the above-mentioned $R^1$, $R^2$, or $R^3$. Preferably, phenyl groups should constitute not less than 10 mol % of $R^4$ and more preferably, phenyl groups should constitute not less than 30 mol % of $R^4$.

The silanes or siloxanes of component (A') are exemplified by methyltrimethoxysilane, methyltriethoxysilane, ethyltrimethoxysilane, ethyltriethoxysilane, vinyltrimethoxysilane, phenyltrimethoxysilane, 3,3,3-trifluoropropyltrimethoxysilane, dimethyldimethoxysilane, methylphenyldimethoxysilane, methylvinyldimethoxysilane, diphenyldimethoxysilane, dimethyldiethoxysilane, methylphenyldiethoxysilane, tetramethoxysilane, tetraethoxysilane, tetrapropoxysilane, dimethoxydiethoxysilane, and products of their hydrolysis and condensation.

In the above-mentioned method of preparation, component (A") is an epoxy-containing alkoxysilane, or a partial hydrolysis product thereof, represented by the general formula $R^7R^8_fSi(OR^9)_{(3-f)}$. In the formula above, $R^7$ is an epoxy-containing organic group, exemplified by the same epoxy-containing organic groups as the above-described $R^1$, $R^2$, or $R^3$. The group $R^8$ in the formula above is a monovalent hydrocarbon group, exemplified by the same monovalent hydrocarbon groups as the above-described $R^1$, $R^2$, or $R^3$. The group $R^9$ in the formula above is an alkyl group, exemplified by methyl, ethyl, propyl, butyl, pentyl, hexyl, and heptyl. Subscript f is 0, 1, or 2, preferably, 0.

The epoxy-containing alkoxysilanes are exemplified by 3-glycidoxypropyl(methyl)dimethoxysilane, 3-glycidoxypropyl(methyl)diethoxysilane, 3-glycidoxypropyl(methyl)dibutoxysilane, 2-(3,4-epoxycyclohexyl)ethyl(methyl)dimethoxysilane, 2-(3,4-epoxycyclohexyl)ethyl(phenyl)diethoxysilane, 2,3-epoxypropyl(methyl)dimethoxysilane, 2,3-epoxypropyl(phenyl)dimethoxysilane, 3-glycidoxypropyltrimethoxysilane, 3-glycidoxypropyltriethoxysilane, 3-glycidoxypropyltributoxysilane, 2-(3,4-epoxycyclohexyl)ethyltrimethoxysilane, 2-(3,4-epoxycyclohexyl)ethyltriethoxysilane, 2,3-epoxypropyltrimethoxysilane, and 2,3-epoxypropyltriethoxysilane.

In the above-described method of preparation, component (A') is reacted with component (A") in the presence of a basic catalyst. The basic catalyst is a catalyst used in the co-hydrolysis, condensation reaction and equilibration reaction of component (A') and component (A"). For instance, one may suggest using sodium hydroxide, potassium hydroxide, cerium hydroxide, and other hydroxides of alkali metals; sodium t-butoxide, potassium t-butoxide, cerium t-butoxide, and other alkoxides of alkali metals; sodium silanolate compounds, potassium silanolate compounds, cerium silanolate compounds, and other silanolate compounds of alkali metals, with potassium- or cerium-based basic catalysts being preferable. Water may be added if needed for the reaction of co-hydrolysis and condensation of component (A') and component (A"). In addition, after reacting component (A') and component (A"), if necessary, the concentration of solid matter in the reaction system may be adjusted using an organic solvent and the reaction may be conducted further.

In the above-described method of preparation, the equilibration reaction causes siloxane bonds to be severed and recombination to take place in a random fashion, with the resultant epoxy-containing silicone resin equilibrated. The temperature of the reaction should be preferably 80° C. to 200° C. and more preferably, 100° C. to 150° C., because if the reaction temperature is low, then the equilibration reaction does not proceed to a sufficient extent, and if the reaction temperature is excessively high, the silicon-bonded organic groups undergo thermal decomposition. In addition, selecting organic solvents with a boiling point of 80° C. to 200° C. makes it possible to easily carry out the equilibration reaction at the reflux temperature. In addition, the equilibration reaction can be terminated by neutralizing the basic catalyst. It is preferable to add carbon dioxide gas, carboxylic acid, or another weak acid to carry out the neutralization. The salts produced as a result of the neutralization can be easily removed by filtration or washing with water.

Component (B) comprises a silicone resin liquid at 25° C. Component (B) is used to improve the dispersibility of the silicone resin composition of the present embodiment in organic resins. There are no limitations concerning the viscosity of component (B) at 25° C., however, preferably, it should be in the range of from 5 to 100,000 mPa·s and more preferably, in the range of from 10 to 5,000 mPa·s. In addition, although there are no limitations concerning the number average molecular weight of component (B), preferably, as converted to standard polystyrene, it should be in the range of from 500 to 5,000, and more preferably, in the range of from 1,000 to 4,000.

There are no limitations concerning the molecular structure of component (B), however, in the same manner as in the case of component (A), it is preferably a silicone resin having at least one unit selected from the group comprising units represented by the formula $R^1SiO_{3/2}$ (T-units), units represented by the formula $R^2_2SiO_{2/2}$ ( )-units), units represented by the formula $R^3_3SiO_{1/2}$ (M-units), and units represented by the formula $SiO_{4/2}$ (Q-units). In addition, component (B) may have silanol groups or silicon-bonded alkoxy groups and other hydrolyzable groups. Component (B) is represented, for instance, by the average unit formula $(R^1SiO_{3/2})_a(R^2_2SiO_{2/2})_b(R^3_3SiO_{1/2})_c(SiO_{4/2})_d(XO_{1/2})_e$. In the formula above, $R^1$, $R^2$, and $R^3$ stand for identical or different monovalent hydrocarbon groups or epoxy-containing organic groups, exemplified by the same groups as those described above. In addition, in the formula above, X is a hydrogen atom or alkyl group, exemplified by the same groups as those described above. Also, in the formula above, subscript a is a positive number, subscript b is 0 or a positive number, subscript c is 0 or a positive number, subscript d is 0 or a positive number, and the subscript e is 0 or a positive number such that b/a is a number from 0 to 10, c/a is a number from 0 to 0.5, d/(a+b+c+d) is a number from 0 to 0.3, and e/(a+b+c+d) is a number from 0 to 1. There are no limitations concerning the method of preparing the silicone resin of component (B). It can be prepared by the same method as the one used for the above-described component (A).

In the silicone resin composition of the present invention, there are no limitations concerning the content of component (B). It is preferable, however, that the content should be in the range of from 0.15 to 200 parts by weight per 100 parts by weight of component (A). This is due to the fact that if the content of component (B) is lower than the lower end of the range, there is a possibility that the dispersibility of the resultant silicone resin composition in organic resins may decrease, and, on the other hand, if it exceeds the upper end of the range, there is a possibility that the moldability of the organic resin containing it may decrease.

Although there are no limitations concerning the method of preparing the silicone resin composition of the present invention, suggested methods include a method in which component (A) and component (B) are mixed in a molten state, or a method in which after mixing component (B) with a solution of component (A) in an organic solvent, the organic solvent is removed. The mixing equipment used at such time is exemplified by single-spindle and double-spindle continuous mixers, two roll mills, Ross mixers, kneader-mixers, and mixers equipped with a pressure-reducing device allowing for solvent removal. In addition, the organic solvents are exemplified by toluene, xylene, and other aromatic hydrocarbons and by acetone, methylethylketone, and other ketone-based solvents.

Although there are no limitations concerning the melt viscosity of the silicone resin composition of the present invention at 100° C., preferably it should be not more than 100,000 mPa·s, and more preferably not more than 10,000 mPa·s. In addition, although there are no limitations concerning the melt viscosity of the silicone resin composition of the present invention at 160° C., preferably, it should be not more than 10,000 mPa·s. In addition, it is preferable that the silicone resin composition of the present invention should be solid at 25° C. and its melting point should be in the range of from 40° C. to 150° C.

The above-described silicone resin composition of the present invention is useful as an additive imparting heat resistance, flame resistance, water repellency, etc. to organic resins. Curable resins and thermoplastic resins are suggested as the organic resins, with which the silicone resin composition of the present invention can be combined, with the curable resins exemplified by phenolic resins, formaldehyde resins, xylene resins, xylene-formaldehyde resins, ketone-formaldehyde resins, furan resins, urea resins, imide resins, melamine resins, alkyd resins, unsaturated polyester resins, aniline resins, sulfonamide resins, silicone resins, epoxy resins, their copolymer-based resins, as well as by mixtures of at least two different kinds of resin from among the above-mentioned, and the thermoplastic resins exemplified by olefinic resins, such as polyethylene, low-density polyethylene, high-density polyethylene, ultra-high molecular weight polyethylene, polypropylene, and ethylene/propylene copolymers consisting of homopolymers and copolymers of alpha-olefins such as ethylene, propylene, 1-butene, 1-pentene, 1-hexene, 4-methyl-1-pentene, as well as ethylene(meth)acrylate ester copolymers and ethylene/vinyl acetate copolymers consisting of copolymers of the alpha-olefins with vinyl acetate, methylmethacrylate, maleic acid and other monomers other than alpha-olefins; acrylic resins, such as homopolymers or copolymers of acrylic acid, methacrylic acid, methyl (meth)acrylate, butyl(meth)acrylate, cyclohexyl(meth)acrylate, 2-ethylcyclohexyl (meth)acrylate, phenyl(meth)acrylate, benzyl(meth)acrylate, 2-hydroxyethyl (meth)acrylate, glycidyl(meth)acrylate, diethylaminoethyl(meth)acrylate, and other (meth)acrylic acid esters, ethylene glycol di(meth)acrylate, trimethylolpropane tri(meth)acrylate, neopentyl glycol di(meth)acrylate and other multifunctional (meth)acrylates and other acrylic monomers, as well as copolymers of the acrylic monomers with styrene, alpha-methylstyrene, and other styrene monomers, vinyl acetate, vinyl chloride, vinylidene chloride, and other vinyl monomers, phenylmaleimide, cyclohexylmaleimide, anhydrous maleimide, and other maleimide monomers; halogenated vinyl resins, such as polyvinyl chloride, polyvinylidene chloride, polyvinyl fluoride, polyvinylidene fluoride, etc.; styrene resins, such as polystyrene, high impact strength polystyrene, acrylonitrile/butadiene/styrene copolymers (ABS resins), acrylonitrile/styrene copolymers, acrylonitrile/acrylic rubber/styrene copolymers, acrylonitrile/ethylenepropylene rubber copolymers, etc.; polyester resins, such as polyethylene terephthalate, polyethylene naphthalate, polyethylene terephthalate/isophthalate, polybutylene terephthalate/isophthalate, etc.; polyamide resins, such as Nylon 6, Nylon 66, Nylon 6/66, Nylon 6/12, Nylon 610, Nylon 612, Nylon 11, Nylon 12, etc.; polyvinyl alcohol resins; polyacetal and other polyoxyalkylene resins; polycarbonate resins; polyvinyl acetate resins; polysulfone resins; polyether sulfone resins; polyphenylene sulfide and other polyarylene sulfide resins; polyarylate resins; polyimide resins; polyamideimide resins, polyether imide resins; polyether ether ketone resins; liquid crystal polyester resins; polytetrafluoroethylene, ethylene/tetrafluoroethylene copolymers, and other fluorine resins; styrene elastomers, olefinic elastomers, urethane elastomers, fluorine elastomers, vinyl chloride elastomers, polyamide elastomers, polyester elastomers, and other thermoplastic elastomer resins; and mixtures and copolymers of two or more of the above thermoplastic resins.

When the silicone resin composition of the present invention is combined with organic resins, there are no limitations concerning the amount added, however, preferably, the amount should be in the range of from 0.1 to 100 parts by weight, and, especially preferably, in the range of from 0.5 to 50 parts by weight per 100 parts by weight of the organic resin.

Another embodiment of the present invention is a curable resin composition comprising:
(I) a curable resin,
(II) a silicone resin with a softening point exceeding 25° C., represented by the average unit formula

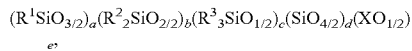

where $R^1$, $R^2$, and $R^3$ stand for identical or different monovalent hydrocarbon groups or epoxy-containing organic groups such that, of the total number of $R^1$, $R^2$, and $R^3$ groups in the molecule, 0.1 to 40 mol % comprises epoxy-containing organic groups and not less than 10 mol % comprises phenyl groups, X is a hydrogen atom or alkyl group, a is a positive number, b is 0 or a positive number, c is 0 or a positive number, d is 0 or a positive number, and e is 0 or a positive number such that b/a is a number from 0 to 10, c/a is a number from 0 to 0.5, d/(a+b+c+d) is a number from 0 to 0.3, and e/(a+b+c+d) is a number from 0 to 0.4, and
(III) a silicone resin that is liquid at 25° C.

The curable resin of component (I) is the main ingredient of the present embodiment and is not subject to any limitations so long as it is curable. The methods used for curing it are exemplified by heat curing, curing with UV, ionizing radiation, and other high-energy beams, moisture curing, condensation type curing, and addition reaction curing. In addition, there are no limitations concerning its physical state, which means that the resin may be either in a liquid or in a solid state at 25° C. Component (I) is exemplified by the above-described curable resins and more preferably, by epoxy resins, phenolic resins, imide resins, or silicone epoxy resins.

There are no particular limitations concerning the epoxy resins so long as they have glycidyl groups and alicyclic epoxy groups. Specifically, the resins are exemplified by o-cresol novolak type epoxy resins, phenolic novolak type epoxy resins, biphenyl type epoxy resins, biphenylaralkyl type epoxy resins, biphenyl novolak type epoxy resins, bisphenol A type epoxy resins, bisphenol F type epoxy resins, bisphenol AD type epoxy resins, bisphenol-S type epoxy resins, dicyclopentadiene type epoxy resins, naphthalene type epoxy resins, anthracene type epoxy resins, naphthol aralkyl type epoxy resins, polyvinyl phenol type epoxy resins, diphenylmethane type epoxy resins, diphenylsulfone type epoxy resins, triphenol alkane type epoxy resins, cresol-naphthol co-condensation type epoxy resins, bisphenylethylene type epoxy resins, fluorene type epoxy resins, stilbene type epoxy resins, spyrocumarone type epoxy resins, norbornene type epoxy resins, halogenated epoxy resins, imido-containing epoxy resins, maleimido-containing epoxy resins, allyl-modified epoxy resins, epoxy resins obtained from heavy oil and pitch, and, furthermore, in order to improve the water repellency of the resultant cured products and to reduce stress in the cured products, epoxy resins containing chemically bonded silane, polyalkylsiloxane, or fluoroalkyl groups. Especially preferable are crystalline resins, exemplified by biphenyl type epoxy resins, bisphenol A type epoxy resins, bisphenol F type epoxy resins, stilbene type epoxy resins, biphenyl ether type epoxy resins, and biphenyl sulfone type epoxy resins, and, more specifically, by biphenyl type epoxy resins represented by the general formula:

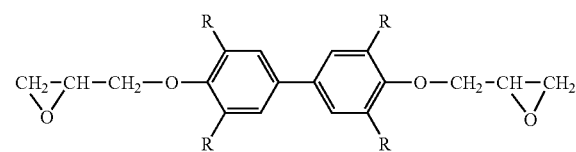

by biphenyl type epoxy resins represented by the general formula:

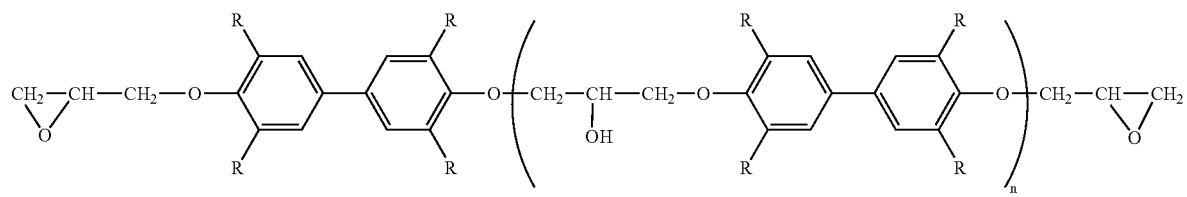

by bisphenol A type epoxy resins represented by the general formula:

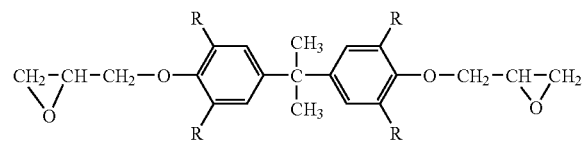

by bisphenol F type epoxy resins represented by the general formula:

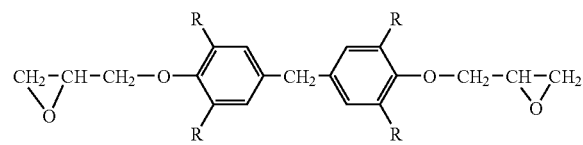

by stilbene type epoxy resins represented by the general formula:

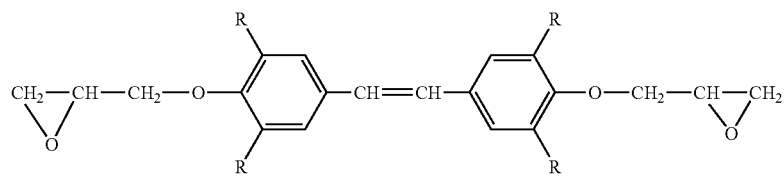

by biphenyl ether type epoxy resins represented by the general formula:

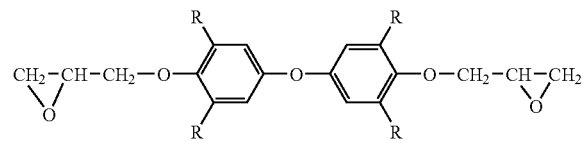

and by biphenyl sulfone type epoxy resins represented by the general formula:

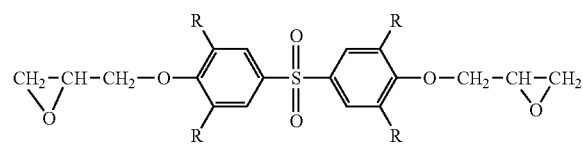

In the formulas, R stands for identical or different hydrogen atoms or alkyl groups, with the alkyl groups of R exemplified by methyl, ethyl, propyl, i-propyl, n-butyl, sec-butyl, and tert-butyl groups. In addition, subscript n in the formulas is a positive integer. Because of the excellent moldability of the composition and excellent flame retardant properties of the resultant cured products, biphenyl type epoxy resins are preferable as the crystalline epoxy resins of component (I). The biphenyl type epoxy resins are exemplified by 4,4'-bis(2,3-epoxypropoxy)biphenyl, 4,4'-bis(2,3-epoxypropoxy)-3,3',5,5'-tetramethylbiphenyl, 4,4'-bis(2,3-epoxypropoxy)-3,3',5,5'-tetraethylbiphenyl, 4,4'-bis(2,3-epoxypropoxy)-3,3',5,5'-tetraethylbiphenyl, and by 4,4'-bis(2,3-epoxypropoxy)-3,3',5,5'-tetrabutylbiphenyl, which can be obtained, for instance, by purchasing YX4000HK resins from Yuka Shell Epoxy Kabushiki Kaisha.

In addition, the phenolic resins are specifically exemplified by polyvinylphenol type phenolic resins, phenol-novolak type phenolic resins, cresol-novolak type phenolic resins, biphenol type phenolic resins, biphenol aralkyl type phenolic resins, naphthol type phenolic resins, terpene type phenolic resins, phenoldicyclopentadiene type phenolic resins, phenol aralkyl type phenolic resins, naphthol aralkyl type phenolic resins, triphenol alkane type phenolic resins, dicyclopentadiene type phenolic resins, cresol-naphthol co-condensation type phenolic resins, xylene-naphthol co-condensation type phenolic resins, phenolic resins obtained from heavy oil and pitch, and, furthermore, in order to improve the water repellency of the resultant cured products and to reduce stress in the cured products, phenolic resins containing chemically bonded silane, polyalkylsiloxane, or fluoroalkyl groups. There are no particular limitations concerning the type of the phenolic resins. They are exemplified by the phenol aralkyl type, biphenol type, naphthol type, novolak type, and the like. Phenol aralkyl type phenolic resins are preferred because of the superior flame retardant properties of the cured products obtained by curing the composition. Such phenol aralkyl type phenolic resins are exemplified by phenol aralkyl type phenolic resins represented by the general formula:

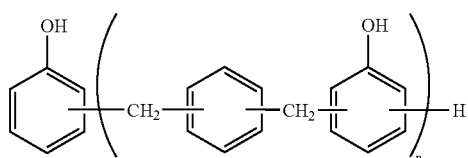

by phenol aralkyl type phenolic resins represented by the general formula:

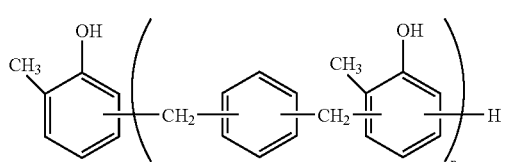

by phenol aralkyl type phenolic resins represented by the general formula:

and by phenol aralkyl type phenolic resins represented by the general formula:

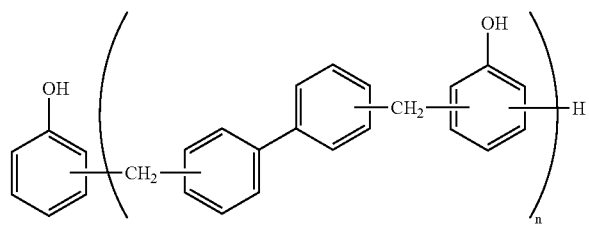

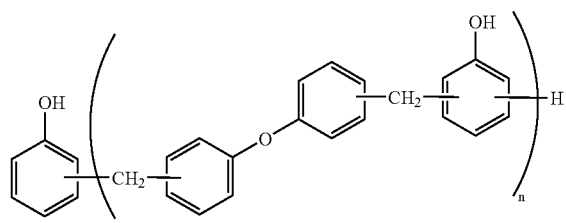

Subscript n in the formulas above is a positive integer. Such phenol aralkyl type phenolic resins can be obtained, for instance, by purchasing the Milex XLC-3L line of products from Mitsui Chemicals, Inc.

It is also preferable to use curable resin compositions that are combinations of epoxy resins and phenolic resins. From the standpoint of moldability, crystalline biphenyl type epoxy resins are preferable as the epoxy resins, and, furthermore, their combinations with phenol aralkyl type phenolic resins are particularly preferable as far as the phenolic resins are concerned. In this case, there are no particular limitations concerning the proportion, in which the epoxy resins and phenolic resins are combined, it is, however, preferable that the ratio of epoxy functional groups/phenol functional groups should be in the range of from 0.5 to 2.5. In addition, the epoxy resins and phenolic resins can be mixed in advance or added separately during mixing with component (II) and component (III).

Component (II), which is a component used to improve the flame retardant properties of the cured resin obtained by curing the curable resin composition without decreasing the moldability of the present composition, is a silicone resin with a softening point exceeding 25° C., represented by the average unit formula $(R^1SiO_{3/2})_a(R^2{}_2SiO_{2/2})_b(R^3{}_3SiO_{1/2})_c(SiO_{4/2})_d(XO_{1/2})_e$. In the formula above, $R^1$, $R^2$, and $R^3$ stand for identical or different monovalent hydrocarbon groups or epoxy-containing organic groups exemplified by the same groups as those described above. Of the total number of $R^1$, $R^2$, and $R^3$ groups in the molecule, 0.1 to 40 mol % comprises epoxy-containing organic groups. This is due to the fact that when the content of the epoxy-containing organic groups is below the lower end of the above-mentioned range, bleeding occurs during the molding of the resultant curable resin composition and the flexibility, moisture resistance, and thermal shock resistance of the resultant cured resin exhibit a tendency to decrease while, on the other hand, when the content exceeds the upper end of the above-mentioned range, the mechanical characteristics of the resultant cured products tend to decrease. In addition, due to their having superior affinity for component (I), providing good dispersibility, and imparting sufficient flame retardant properties to the resultant cured resin, not less than 10 mol % of the total number of $R^1$, $R^2$, and $R^3$ groups has to include phenyl groups. Preferably, phenyl groups should comprise not less than 10 mol % of $R^1$, and even more preferably, phenyl groups should comprise not less than 30 mol % of $R^1$. In addition, X in the formula above is a hydrogen atom or alkyl group, exemplified by the same groups as those mentioned above.

In the formula above, subscript a is a positive number, subscript b is 0 or a positive number, subscript c is 0 or a positive number, subscript d is 0 or a positive number, and subscript e is 0 or a positive number such that b/a is a number from 0 to 10, c/a is a number from 0 to 0.5, d/(a+b+c+d) is a number from 0 to 0.3, and e/(a+b+c+d) is a number from 0 to 0.4. This is due to the fact that the softening point of a silicone resin with a b/a exceeding 10 may drop conspicuously and its affinity for component (I) may also decrease. In addition, a silicone resin with a c/(a+b+c) exceeding 0.3 has a tendency toward decreased dispersibility in component (I).

There are no limitations concerning the weight-average molecular weight of component (II). Preferably, however, it should be in the range of from 500 to 50,000, and more preferably, in the range of from 500 to 10,000. In addition, although there are no particular limitations if the softening point of component (II) exceeds 25° C., preferably, it should be in the range of from 40 to 250° C. and more preferably, in the range of from 40 to 150° C. This is due to the fact that silicone resin with a softening point below the lower end of the above-mentioned range bleeds during the molding of the curable resin composition, thereby contaminating the mold, and tends to decrease the mechanical characteristics of the cured products obtained by curing the above-mentioned composition. On the other hand, silicone resin with a softening point exceeding the upper end of the above-mentioned range exhibits a tendency towards increased difficulty of uniform dispersion in component (I). There are no particular limitations concerning the methods used to regulate the characteristics of such component (II), which are exemplified by the same methods as those described above.

In the curable silicone resin composition, there are no limitations concerning the content of component (II), which, preferably, should be in the range of from 0.1 to 500 parts by weight and more preferably, in the range of from 0.5 to 100 parts by weight per 100 parts by weight of component (I). This is due to the fact that if the content of component (II) is below the lower end of the above-mentioned range, it may not be possible to obtain cured resin possessing superior flexibility, moisture resistance, and thermal shock resistance, and, on the other hand, if it exceeds the upper end of the above-mentioned range, the mechanical strength of the cured resin may dramatically decrease.

Component (III), a silicone resin liquid at 25° C., is a component used to improve the moldability of the present composition without causing deterioration in its flame retardant properties. Although there are no particular limitations concerning the viscosity of component (III) at 25° C., preferably, its viscosity should be in the range of from 5 to 100,000 mPa·s and more preferably, in the range of from 10 to 5,000 mPa·s. In addition, although there are no limitations concerning the number average molecular weight of component (III), preferably, as converted to standard polystyrene, it should be in the range of from 500 to 5,000 and more preferably in the range of from 1,000 to 4,000.

There are no particular limitations concerning the molecular structure of component (III), however, in the same manner as with component (II), this component is preferably a silicone resin having at least one unit selected from the group comprising units represented by the formula $R^1SiO_{3/2}$ (T-units), units represented by the formula $R^2{}_2SiO_{2/2}$ (D-units), units represented by the formula $R^3{}_3SiO_{1/2}$ (M-units), and units represented by the formula $SiO_{4/2}$ (Q-units). In addition, component (III) may have silanol groups or silicon-bonded alkoxy groups and other hydrolyzable groups. Such component (III) is represented, for instance, by the average unit formula $(R^1SiO_{3/2})_a(R^2{}_2SiO_{2/2})_b(R^3{}_3SiO_{1/2})_c(SiO_{4/2})_d(XO_{1/2})_e$. In the formula above, $R^1$, $R^2$, and $R^3$ stand for identical or different monovalent hydrocarbon groups or epoxy-containing organic groups, exemplified by the same groups as those described above. In addition, in the formula above, X is a hydrogen atom or alkyl group, exemplified by the same groups as those described above. Also, in the formula above, subscript a is a positive number, subscript b is 0 or a positive number, subscript c is 0 or a positive number, subscript d is 0 or a positive number, and subscript e is 0 or a positive number such that b/a is a number from 0 to 10, c/a is a number from 0 to 0.5, d/(a+b+c+d) is a number from 0 to 0.3, and e/(a+b+c+d) is a number from 0 to 1. There are no limitations concerning the method of preparing component (III). It can be prepared by the same method as the one used for the above-described component (II).

In the curable silicone resin composition, there are no limitations concerning the content of component (III), but it is preferable, however, that the content should be in the range of from 0.15 to 200 parts by weight and more preferably, in the range of from 0.5 to 100 parts by weight per 100 parts by weight of component (I). This is due to the fact that if the content of component (III) is lower than the lower end of the above-mentioned range, there is a possibility that it may be impossible to obtain cured resin possessing superior flexibility, moisture resistance, and thermal shock resistance, and, on the other hand, if it exceeds the upper end of the above-mentioned range, there is a possibility that the mechanical strength of the cured resin may conspicuously decrease.

So long as the object of the present invention is not impaired, the curable silicone resin composition may contain (IV) inorganic fillers as other optional components. Component (IV) is exemplified by glass fiber, asbestos, alumina fiber, ceramic fiber including alumina and silica as ingredients, boron fiber, zirconia fiber, silicon carbonate fiber, metal fiber, and other fibrous fillers; glassy silica, crystalline silica, precipitated silica, fumed silica, calcined silica, zinc oxide, calcined clay, carbon black, glass beads, alumina, talc, calcium carbonate, clay, aluminum hydroxide, magnesium hydroxide, barium sulfate, titanium dioxide, aluminum nitride, boron nitride, silicon carbonate, aluminum oxide, magnesium oxide, titanium oxide, beryllium oxide, kaolin, mica, zircona, and other pulverulent fillers, as well as mixture of two or more of the above fillers. In addition, there are no limitations concerning the average particle size and shape of component (IV), but it is preferable to use spherical silica with an average particle size of 0.1 to 40 μm.

In the composition of the present invention, there are not limitations concerning the content of component (IV), however, the content is preferably 400 to 1,200 parts by weight per 100 parts by weight of the total of from component (I) through component (III). This is due to the fact that there may be an increase in the thermal expansion coefficient of the resultant cured resin, cracks may appear as a result of stress, and flame retardant properties may deteriorate if the content of component (IV) is less then the lower end of the above-mentioned range, and, on the other hand, the moldability of the resultant composition may decrease if it exceeds the upper end of the above-mentioned range.

In the curable silicone resin composition, silane coupling agents, titanate coupling agents, and other coupling agents can be used to form an excellent dispersion of component (IV) in component (I) and improve the affinity between component (I) and component (IV). The silane coupling agents are exemplified 3-glycidoxypropyltrimethoxysilane, 3-glycidoxypropylmethyldiethoxysilane, 2-(3,4-epoxycyclohexyl)ethyltrimethoxysilane, and other epoxy-containing alkoxysilanes; N-(2-aminoethyl)-3-aminopropyltrimethoxysilane, 3-aminopropyltriethoxysilane, N-phenyl-3-aminopropyltrimethoxysilane, and other amino-containing alkoxysilanes; 3-mercaptopropyltrimethoxysilane, and other mercapto-containing alkoxysilanes. In addition, the titanate coupling agents are exemplified by i-propoxy titanium tri(i-isostearate).

In addition, the curable silicone resin composition preferably contains cure promoters used to promote the curing reaction of component (I). Triphenylphosphine, tributylphosphine, trip-methylphenyl)phosphine, tri(nonylphenyl)phosphine, triphenylphosphine-triphenyl borate, tetraphenylphosphine-tetraphenyl borate, and other phosphorus compounds; triethylamine, benzyldimethylamine, alpha-methylbenzyldimethylamine, 1,8-diazabicyclo[5.4.0]undecene-7, and other tertiary amine compounds; 2-methylimidazole, 2-phenylimidazole, 2-phenyl-4-methylimidazole and other imidazole compounds can be suggested as examples of the cure promoters.

If necessary, the curable silicone resin composition may also contain thermoplastic resins, thermoplastic elastomers, organosynthetic rubber, silicones, and other stress-reducing agents; carnauba wax, higher aliphatic acids, synthetic waxes, and other waxes; carbon black and other colorants; halogen trapping agents, etc.

There are no limitations concerning the methods used to adjust the curable silicone resin composition; thus, it can be prepared by uniformly mixing from component (I) through component (III) and other optional components. The dispersibility of component (II) can be improved if component (I) is mixed with a silicone resin composition prepared by mixing component (III) with component (II) and advance. In addition, in case component (IV) is added as an optional component, the method of preparation may be exemplified by a process, in which, after mixing component (IV) with component (I), component (II), component (III), and other optional components are uniformly mixed therewith, and, at such time, integral blend processes be used by adding coupling agents to component (I) and component (IV), or processes, in which, after pre-treating the surface of component (IV) with a coupling agent, it is mixed with component (I). In addition, the equipment used to prepare the curable silicone resin composition is exemplified by single- or double-spindle continuous mixers, two roll mills, Ross mixers, and kneader-mixers.

Because the curable resin composition of the present invention has superior flowability prior to curing and the cured resin obtained after curing possesses superior flame retardant properties, it can be used for preparing electrical or electronic element sealing resin compositions, paint, coating agents, adhesives, etc. using transfer molding, injection molding, potting, casting, powder coating, and other techniques. The curable resin composition of the present invention is particularly suitable for semiconductor sealing applications using transfer pressing.

EXAMPLES

The following examples are disclosed to further teach, but not limit, the silicone resin composition, curable resin composition, and cured resin of the present invention, which is properly delineated by the appended claims. As used herein, "Me" stands for "methyl," "Ph" stands for "phenyl," "Ep" stands for "3-glycidoxypropyl," and "Pr" stands for "isopropyl." In addition, the word "viscosity" refers to values obtained at 25° C.

The characteristics of the curable resin composition and the cured resin produced therefrom were measured by the methods described below. In addition, the curable resin composition was transfer press molded at 175° C. for 2 minutes under 70 kgf/cm² and then cured by post-curing at 180° C. for 5 hours.

Moldability

Spiral flow: measured at 175° C. and 70 kgf/cm² by the method prescribed by an EMMI standard.

Mold contamination: after molding 5 disks with a diameter of 50 mm and a thickness of 2 mm in a row, the tarnishing of the chrome-plated surface of the mold was observed visually, designating cases, in which there was no mold contamination as ○, cases, in which there was a thin tarnishing layer on the surface of the mold, as Δ, and cases, in which there was contamination on the surface of the mold, as x.

Burrs: the length of the burrs formed during molding in a burr measurement mold (20 μm-deep grooves), designating cases, in which the length of the burrs was not more than 2 mm, as ○, cases, in which burrs exceeded 2 mm but were not larger than 10 mm, as Δ, and cases, in which the burrs exceeded 10 mm, as x.

Flame Retardant Properties:

LOI value: the lowest oxygen concentration required for burning was determined using an oxygen index test apparatus and test specimens with a thickness of 1/16 inch (about 1.6 mm) in accordance with JIS K 7201 "Test Method For Determination of Burning Behavior Of Plastics By Oxygen Index." An average value of the lowest oxygen concentration was obtained from 5 test specimens.

Burning time: test specimens with a thickness of 1/16 inch (about 1.6 mm) were prepared and their burning times (in seconds) were measured in accordance with Standard UL94 (Standard for test for flammability of plastic material for parts in devices and appliances) established by Underwriters Laboratories, Inc.

The characteristics of the silicone resin and silicone resin composition were measured in the following manner.

Softening point: using a melting point determination apparatus (the "Micro-Melting Point Apparatus from Kabushiki Kaisha Yanagimoto Seisakusho), the silicone resin was melted by raising the temperature at a rate of 1° C./min, with the temperature at which the resin turned to drops used as the softening point.

Melt viscosity: using a Model DV-III Programmable Rheometer from Brookfield Engineering Laboratories Inc., the silicone resin was heated, raising it temperature from room temperature at a temperature rise rate of 2° C./min and maintaining it for 20 min at 100° C. and 160° C. The melt viscosities at the corresponding temperatures were measured.

Viscosity: viscosity was measured using a rotational viscometer (the Vismetron VG-DA from Shibaura System, rotor: No. 4, speed: 60 rpm).

Reference Example 1

250 g water and 400 g toluene were placed in a 2000-mL flask equipped with a thermometer and a reflux condenser, and a mixture of 300 g phenyltrichlorosilane and 200 g toluene was added thereto in a dropwise manner while cooling the flask in an ice bath. Upon termination of the dropwise addition, the mixture was refluxed for 6 hours with heating, after which the toluene solution was separated. The toluene solution was repeatedly washed with water such until the wash liquid became neutral. After that, toluene was eluted by heating the toluene solution under reduced pressure, yielding 177.7 g of a white solid.

116.0 g of the above-mentioned white solid, 20.2 g 3-glycidoxypropylmethyldimethoxysilane, 19.1 g dimethyldimethoxysilane, 150 g toluene, and 0.15 g cerium hydroxide were placed in a 500-mL flask equipped with a thermometer and a Dean-Stark tube. Next, 10.0 g water was added to the system, whereupon, under heating, the produced methanol and water were eluted. When the elution of the water ceased, the system was cooled down, and another 10.0 g water added to the system. After that, by heating the system, the produced methanol and water were eluted, and the solution was refluxed for 6 hours with heating. After cooling it down, a neutralization treatment was carried out by adding 0.08 g acetic acid to the system. Next, the system was washed with water 3 times. The resultant toluene solution was placed in a 500-mL flask equipped with a Dean-Stark tube and subjected to azeotropic dehydration. Impurities were filtered off and 140 g of a colorless transparent solid was obtained by eluting toluene by heating the filtrate under reduced pressure. It was confirmed that the colorless transparent solid was a 3-glycidoxypropyl-containing silicone resin having a weight-average molecular weight of 2600, a softening point of 73° C., a melt viscosity of 540,000 mPa·s at 100° C., a melt viscosity of 70,000 mPa·s at 160° C., and an epoxy equivalent of 1620, represented, according to ²⁹Si-nuclear magnetic resonance spectral analysis, by the average unit formula:

$(PhSiO_{3/2})_{0.78}(Me_2SiO_{2/2})_{0.14}(EpMeSiO_{2/2})_{0.08}$

Relative to all silicon-bonded organic groups, the content of 3-glycidoxypropyl groups in the silicone resin was 7 mol %, and the content of phenyl groups was 64 mol %.

Reference Example 2

180 g toluene, 60 g isopropyl alcohol, and 250 g water were placed in a 2000-mL four-neck flask fitted with a stirrer, cooler, dropping funnel, and a temperature gauge and a mixed solution of 147 g phenyltrichlorosilane and 52.8 g isopropyltrichlorosilane was added thereto in a dropwise manner while cooling the flask in an ice bath. Upon termination of the dropwise addition, the mixture was stirred for 30 minutes at room temperature, after which it was refluxed with heating for 3 hours in order to bring hydrolysis to completion. Next, the resultant toluene solution was allowed to stand and the water layer was removed, whereupon it was repeatedly washed with water such until the wash liquid became neutral. After that, the toluene solution was subjected to azeotropic dehydration. After cooling, insoluble matter was removed by filtration, and 115.2 g of a colorless transparent solid was obtained by eluting the toluene by heating the filtrate under reduced pressure. It was confirmed that the colorless transparent solid was a silicone resin having a weight-average molecular weight of 1600, a softening point of 80° C., a melt viscosity of 200,000 mPa·s at 100° C., a melt viscosity of 3,000 mPa·s at 160° C., represented, according to $^{29}$Si-nuclear magnetic resonance spectral analysis, by the average unit formula:

$(PhSiO_{3/2})_{0.70}(PrSiO_{3/2})_{0.30}(HO_{1/2})_{0.43}$

Reference Example 3

A liquid silicone resin with a number-average molecular weight of 1200 and a viscosity of 120 mPa·s, represented by the average unit formula:

$(PhSiO_{3/2})_{0.67}(Me_2SiO_{2/2})_{0.33}(MeO_{1/2})_{0.74}$ was prepared by subjecting phenyltrimethoxysilane and dimethyldimethoxysilane to a reaction of co-hydrolysis and condensation.

Reference Example 4

A liquid silicone resin with a number-average molecular weight of 2000 and a viscosity of 1300 mPa·s, represented by the average unit formula:

$(PhSiO_{3/2})_{0.62}(Me_2SiO_{2/2})_{0.30}(EpMeSiO_{2/2})_{0.08}(MeO_{1/2})_{0.75}$ was prepared by subjecting phenyltrimethoxysilane, dimethyldimethoxysilane, and methyl(3-glycidoxypropyl) dimethoxysilane to a reaction of co-hydrolysis and condensation.

Application Example 1

After mixing 16.2 parts by weight of the silicone resin prepared in Reference Example 1 with 1.8 parts by weight of the silicone resin prepared in Reference Example 3 in a 30-mL kneader (Brabender mixer from Toyo Seiki Co., Ltd.) for 5 minutes at 120° C., a transparent uniform silicone resin composition was prepared by cooling the mixture to room temperature. The melt viscosity of the silicone resin composition was measured. The results are listed in Table 1.

Application Example 2

16.2 parts by weight of the silicone resin prepared in Reference Example 1 was placed in a four-neck flask and dissolved at room temperature by adding 50 mL toluene. 1.8 parts by weight of the silicone resin prepared in Reference Example 4 was added to and dissolved in this solution, whereupon toluene was eluted under 10 mmHg at 100° C., preparing a transparent silicone resin composition. The melt viscosity of the silicone resin composition was measured. The results are listed in Table 1.

Comparative Example 1

In the same manner as in Application Example 1, 16.2 parts by weight of the silicone resin prepared in Reference Example 2 and 1.8 parts by weight of the silicone resin prepared in Reference Example 3 were mixed and then cooled to prepare a white opaque silicone resin composition. The melt viscosity of the silicone resin composition was measured. The results are listed in Table 1.

TABLE 1

| | Example Type | | |
| --- | --- | --- | --- |
| | Application Examples | | Comparative Example |
| Parameter | 1 | 2 | 1 |
| Melt Viscosity (mPa · s) | | | |
| 100° C. | 24,000 | 30,000 | 400,000 |
| 160° C. | 1,000 | 1,000 | 4,000 |
| External Appearance | Transparent, uniform | Transparent, uniform | White, non-uniform |

Practical Example 1

27 g of aromatic polycarbonate resin (Taflon A1900 from Idemitsu Petrochemical Co., Ltd.) and 3 g of the silicone resin composition prepared in Application Example 1 were mixed for 5 minutes at 280° C. in a 30-mL kneader (Brabender mixer from Toyo Seiki Co., Ltd.), after which test specimens were fabricated in an injection molding machine. The oxygen index (LOI) of the specimens was measured in accordance with JIS K 7201 "Test Method For Determination of Burning Behavior Of Plastics By Oxygen Index." The results are listed in Table 2.

Practical Example 2

27 g of aromatic polycarbonate resin (Taflon A1900 from Idemitsu Petrochemical Co., Ltd.) and 3 g of the silicone resin composition prepared in Application Example 2 were mixed for 5 minutes at 280° C. in a 30-mL kneader (Brabender mixer from Toyo Seiki Co., Ltd.), after which test specimens were fabricated in an injection molding machine. The oxygen index (LOI) of the specimens was measured in the same manner as in Practical Example 1. The results are listed in Table 2.

Practical Example 3

27 g of aromatic polycarbonate resin (Taflon A1900 from Idemitsu Petrochemical Co., Ltd.) and 3 g of the silicone resin composition prepared in Comparative Example 1 were mixed for 5 minutes at 280° C. in a 30-mL kneader (Brabender mixer from Toyo Seiki Co., Ltd.), after which test specimens were fabricated in an injection molding machine. The oxygen index (LOI) of the specimens was measured in the same manner as in Practical Example 1. The results are listed in Table 2.

TABLE 2

| | Example Type Practical Examples | | |
| --- | --- | --- | --- |
| Parameter | 1 | 2 | 3 |
| LOI | 35 | 35 | 28 |

Application Example 3

A curable epoxy resin composition was prepared by uniformly melt-mixing 46.9 parts by weight of crystalline biphenyl type epoxy resin (Epicoat YX4000H from Yuka Shell Epoxy Kabushild Kaisha; epoxy equivalent=190, melting point=105° C.), 43.1 parts by weight of phenol aralkyl type phenolic resin (Milex XLC-3L from Mitsui Chemicals, Inc.; phenolic hydroxyl equivalent=168) (amount at which the mole ratio of the phenolic hydroxyl groups of this phenolic resin relative to the epoxy groups of the above-mentioned epoxy resin is 1.0), 18 parts by weight of the silicone resin composition prepared in Application Example 1, 510 parts by weight of amorphous spherical silica with an average particle size of 14 μm (FB-48X from Denki Kagaku Kogyo Kabushiki Kaisha), 0.4 parts by weight of carbon black, 1 part by weight 3-glycidoxypropyltrimethoxysilane, 0.9 parts by weight of carnauba wax, and 0.66 parts by weight of triphenylphosphine in a two roll mill with heating. The characteristics of the curable epoxy resin composition and cured resin made therefrom were measured. The results are listed in Table 3.

Application Example 4

A curable epoxy resin composition was prepared by uniformly melt-mixing 46.9 parts by weight of crystalline biphenyl type epoxy resin (Epicoat YX4000H from Yuka Shell Epoxy Kabushiki Kaisha; epoxy equivalent=190, melting point=105° C.), 43.1 parts by weight of phenol aralkyl type phenolic resin (Milex XLC-3L from Mitsui Chemicals, Inc.; phenolic hydroxyl equivalent=168) (amount at which the mole ratio of the phenolic hydroxyl groups of this phenolic resin relative to the epoxy groups of the above-mentioned epoxy resin is 1.0), 18 parts by weight of the silicone resin composition prepared in Application Example 2, 510 parts by weight of amorphous spherical silica with an average particle size of 14 μm (FB-48X from Denki Kagaku Kogyo Kabushild Kaisha), 0.4 parts by weight of carbon black, 1 part by weight 3-glycidoxypropyltrimethoxysilane, 0.9 parts by weight of carnauba wax, and 0.66 parts by weight of triphenylphosphine in a two roll mill with heating. The characteristics of the curable epoxy resin composition and cured resin made therefrom were measured. The results are listed in Table 3.

Comparative Example 2

A curable epoxy resin composition was prepared by uniformly melt-mixing 46.9 parts by weight of crystalline biphenyl type epoxy resin (Epicoat YX4000H from Yuka Shell Epoxy Kabushiki Kaisha; epoxy equivalent=190, melting point=105° C.), 43.1 parts by weight of phenol aralkyl type phenolic resin (Milex XLC-3L from Mitsui Chemicals, Inc.; phenolic hydroxyl equivalent=168) (amount at which the mole ratio of the phenolic hydroxyl groups of this phenolic resin relative to the epoxy groups of the above-mentioned epoxy resin is 1.0), 18 parts by weight of the silicone resin prepared in Reference Example 1, 510 parts by weight of amorphous spherical silica with an average particle size of 14 μm (FB-48X from Denki Kagaku Kogyo Kabushiki Kaisha), 0.4 parts by weight of carbon black, 1 part by weight 3-glycidoxypropyltrimethoxysilane, 0.9 parts by weight of carnauba wax, and 0.66 parts by weight of triphenylphosphine in a two roll mill with heating. The characteristics of the curable epoxy resin composition and cured resin made therefrom were measured. The results are listed in Table 3.

Comparative Example 3

A curable epoxy resin composition was prepared by uniformly melt-mixing 46.9 parts by weight of crystalline biphenyl type epoxy resin (Epicoat YX4000H from Yuka Shell Epoxy Kabushiki Kaisha; epoxy equivalent=190, melting point=105° C.), 43.1 parts by weight of phenol aralkyl type phenolic resin (Milex XLC-3L from Mitsui Chemicals, Inc.; phenolic hydroxyl equivalent=168) (amount at which the mole ratio of the phenolic hydroxyl groups of this phenolic resin relative to the epoxy groups of the above-mentioned epoxy resin is 1.0), 18 parts by weight of the silicone resin composition prepared in Comparative Example 1, 510 parts by weight of amorphous spherical silica with an average particle size of 14 μm (FB-48X from Denki Kagaku Kogyo Kabushiki Kaisha), 0.4 parts by weight of carbon black, 1 part by weight 3-glycidoxypropyltrimethoxysilane, 0.9 parts by weight of carnauba wax, and 0.66 parts by weight of triphenylphosphine in a two roll mill with heating. The characteristics of the curable epoxy resin composition and cured resin made therefrom were measured. The results are listed in Table 3.

Comparative Example 4

A curable epoxy resin composition was prepared by uniformly melt-mixing 46.9 parts by weight of crystalline biphenyl type epoxy resin (Epicoat YX4000H from Yuka Shell Epoxy Kabushild Kaisha; epoxy equivalent=190, melting point=105° C.), 43.1 parts by weight of phenol aralkyl type phenolic resin (Milex XLC-3L from Mitsui Chemicals, Inc.; phenolic hydroxyl equivalent=168) (amount at which the mole ratio of the phenolic hydroxyl groups of this phenolic resin relative to the epoxy groups of the above-mentioned epoxy resin is 1.0), 510 parts by weight of amorphous spherical silica with an average particle size of 14 μm (FB-48X from Denki Kagaku Kogyo Kabushiki Kaisha), 0.4 parts by weight of carbon black, 1 part by weight 3-glycidoxypropyltrimethoxysilane, 0.9 parts by weight of carnauba wax, and 0.66 parts by weight of triphenylphosphine in a two roll mill with heating. The characteristics of the curable epoxy resin composition and cured resin made therefrom were measured. The results are listed in Table 3.

Comparative Example 5

A curable epoxy resin composition was prepared by uniformly melt-mixing 46.9 parts by weight of crystalline biphenyl type epoxy resin (Epicoat YX4000H from Yuka Shell Epoxy Kabushild Kaisha; epoxy equivalent=190, melting point=105° C.), 43.1 parts by weight of phenol aralkyl type phenolic resin (Milex XLC-3L from Mitsui Chemicals, Inc.; phenolic hydroxyl equivalent=168) (amount at which the mole ratio of the phenolic hydroxyl groups of this phenolic resin relative to the epoxy groups of the above-mentioned epoxy resin is 1.0), 18 parts by weight of the silicone resin prepared in Reference Example 3, 510 parts by weight of amorphous spherical silica with an average particle size of 14 μm (FB-48X from Denki Kagaku Kogyo Kabushiki Kaisha), 0.4 parts by weight of carbon black, 1 part by weight 3-glycidoxypropyltrimethoxysilane, 0.9 parts by weight of carnauba wax, and 0.66 parts by weight of triphenylphosphine in a two roll mill with heating. The characteristics of the curable epoxy resin composition and cured resin made therefrom were measured. The results are listed in Table 3.

TABLE 3

| | | Example Type | | | | | |
| --- | --- | --- | --- | --- | --- | --- | --- |
| | | Application Examples | | Comparative Examples | | | |
| Parameter | | 3 | 4 | 2 | 3 | 4 | 5 |
| Moldability | Spiral flow (inch) | 33 | 33 | 26 | 45 | 29 | 48 |
| | Mold contamination | ○ | ○ | ○ | X | ○ | X |
| | Burrs | ○ | ○ | ○ | X | ○ | X |
| Flame retardant properties | LOI | 44 | 45 | 44 | 45 | 39 | 36 |
| | Burning time (sec) | 13 | 13 | 13 | 25 | 31 | ≧40 |

Application Example 5

A curable epoxy resin composition was prepared by uniformly melt-mixing 46.9 parts by weight of crystalline biphenyl type epoxy resin (Epicoat YX4000H from Yuka Shell Epoxy Kabushiki Kaisha; epoxy equivalent=190, melting point=105° C.), 43.1 parts by weight of phenol aralkyl type phenolic resin (Milex XLC-3L from Mitsui Chemicals, Inc.; phenolic hydroxyl equivalent=168) (amount at which the mole ratio of the phenolic hydroxyl groups of this phenolic resin relative to the epoxy groups of the above-mentioned epoxy resin is 1.0), 18 parts by weight of the silicone resin composition prepared in Application Example 1, 350 parts by weight of crushed amorphous silica with an average particle size of 50 μm (from Tatsumori Co., Ltd.), 0.4 parts by weight of carbon black, 1 part by weight 3-glycidoxypropyltrimethoxysilane, 0.9 parts by weight of carnauba wax, and 0.66 parts by weight of triphenylphosphine in a two roll mill with heating. The following characteristics of the curable epoxy resin composition and cured resin made therefrom were measured. The results are listed in Table 4.

Dispersion Particle Size of Silicone Resin: Samples fabricated by molding disks with a diameter of 10 cm and a thickness of 5 mm under a pressure of 70 kgf/cm$^2$ at 175° C. for 3 minutes and post-curing them for 5 hours at 180° C. were cut up into pieces and cut surfaces were examined with an electron microscope.

Water Absorption Coefficient: The same disks as the ones described above were placed in a pressure cooker vessel and kept at 120° C. for 10 hours. After that, the coefficient was calculated from the weight change ratio obtained immediately after cooling and removing them from the vessel.

Mold Contamination: After molding 5 disks identical to the ones described above in a row, the tarnishing of the chrome-plated surface of the mold was examined visually, designating cases, in which there was no mold contamination as ○, cases, in which there was a thin tarnishing layer on the surface of the mold, as Δ, and cases, in which there was contamination on the surface of the mold, as x.

Application Example 6

A curable epoxy resin composition was prepared by uniformly melt-mixing 46.9 parts by weight of crystalline biphenyl type epoxy resin (Epicoat YX4000H from Yuka Shell Epoxy Kabushiki Kaisha; epoxy equivalent=190, melting point=105° C.), 43.1 parts by weight of phenol aralkyl type phenolic resin (Milex XLC-3L from Mitsui Chemicals, Inc.; phenolic hydroxyl equivalent=168) (amount at which the mole ratio of the phenolic hydroxyl groups of this phenolic resin relative to the epoxy groups of the above-mentioned epoxy resin is 1.0), 18 parts by weight of the silicone resin composition prepared in Application Example 2, 350 parts by weight of crushed amorphous silica with an average particle size of 50 μm (from Tatsumori Co., Ltd.), 0.4 parts by weight of carbon black, 1 part by weight 3-glycidoxypropyltrimethoxysilane, 0.9 parts by weight of carnauba wax, and 0.66 parts by weight of triphenylphosphine in a two roll mill with heating. The characteristics of the curable epoxy resin composition and cured resin made therefrom were measured in the same manner as in Application Example 5. The results are listed in Table 4.

Comparative Example 6

A curable epoxy resin composition was prepared by uniformly melt-mixing 46.9 parts by weight of crystalline biphenyl type epoxy resin (Epicoat YX4000H from Yuka Shell Epoxy Kabushiki Kaisha; epoxy equivalent=190, melting point=105° C.), 43.1 parts by weight of phenol aralkyl type phenolic resin (Milex XLC-3L from Mitsui Chemicals, Inc.; phenolic hydroxyl equivalent=168) (amount at which the mole ratio of the phenolic hydroxyl groups of this phenolic resin relative to the epoxy groups of the above-mentioned epoxy resin is 1.0), 18 parts by weight of the silicone resin composition prepared in Comparative Example 1, 350 parts by weight of crushed amorphous silica with an average particle size of 50 μm (from Tatsumori Co., Ltd.), 0.4 parts by weight of carbon black, 1 part by weight glycidoxypropyltrimethoxysilane, 0.9 parts by weight of carnauba wax, and 0.66 parts by weight of triphenylphosphine in a two roll mill with heating. The characteristics of the curable epoxy resin composition and cured resin made therefrom were measured in the same manner as in Application Example 5. The results are listed in Table 4.

Comparative Example 7

A curable epoxy resin composition was prepared by uniformly melt-mixing 46.9 parts by weight of crystalline biphenyl type epoxy resin (Epicoat YX4000H from Yuka Shell Epoxy Kabushiki Kaisha; epoxy equivalent=190, melting point=105° C.), 43.1 parts by weight of phenol aralkyl type phenolic resin (Milex XLC-3L from Mitsui Chemicals, Inc.; phenolic hydroxyl equivalent=168) (amount at which the mole ratio of the phenolic hydroxyl groups of this phenolic resin relative to the epoxy groups of the above-mentioned epoxy resin is 1.0), 18 parts by weight of the silicone resin prepared in Reference Example 1, 350 parts by weight of crushed amorphous silica with an average particle size of 50 μm (from Tatsumori Co., Ltd.), 0.4 parts by weight of carbon black, 1 part by weight glycidoxypropyltrimethoxysilane, 0.9 parts by weight of carnauba wax, and 0.66 parts by weight of triphenylphosphine in a two roll mill with heating. The characteristics of the curable epoxy resin composition and cured resin made therefrom were measured in the same manner as in Application Example 5. The results are listed in Table 4.

TABLE 4

|  | Example Type | | | |
| --- | --- | --- | --- | --- |
|  | Application Examples | | Comparative Examples | |
| Parameter | 5 | 6 | 6 | 7 |
| Dispersion particle size of silicone resin (μm) | ≦5 | ≦5 | 10~20 | 10~50 |
| Coefficient of moisture absorption (weight %) | 0.4 | 0.5 | 0.8 | 0.9 |
| Mold contamination | ○ | ○ | X | X |

The silicone resin composition of the present invention has a low melt viscosity and excellent reactivity and dispersibility in organic resins. The curable resin composition of the present invention possesses excellent moldability, forms cured resin of superior flame retardant properties, and does not have an adverse impact on the human body and the environment because it does not contain halogenated epoxy resins and antimony oxides. In addition, the cured resin of the present invention has little adverse impact on the human body and the environment and possesses superior flame retardant properties.

What is claimed is:

1. A curable resin composition comprising:
   (I) crystalline epoxy resin,
   (II) a silicone resin with a softening point exceeding 25° C., represented by the average unit formula $(R^1SiO_{3/2})_a(R^2{}_2SiO_{2/2})_b(R^3{}_3SiO_{1/2})_c(SiO_{4/2})_d(XO_{1/2})_e$, wherein $R^1$, $R^2$, and $R^3$ are independently selected from the group consisting of monovalent hydrocarbon groups and epoxy-containing organic groups such that, of the total number of $R^1$, $R^2$, and $R^3$ groups in the molecule, 0.1 to 40 mol% comprises epoxy-containing organic groups and not less than 10 mol% comprises phenyl groups, X is selected from the group consisting of a hydrogen atom and alkyl group, a is a positive number, b is 0 or a positive number, c is 0 or a positive number, d is 0 or a positive number, and e is 0 or a positive number such that b/a is a number from 0 to 10, c/a is a number from 0 to 0.5, d/(a+b+c+d) is a number from 0 to 0.3, and e/(a+b+c+d) is a number from 0 to 0.4, and
   (III) a silicone resin that is liquid at 25° C.

2. The curable resin composition set forth in claim 1, wherein component (III) is a silicone resin represented by average unit formula $(R^1SiO_{3/2})_a(R^2{}_2SiO_{2/2})_b(R^3{}_3SiO_{1/2})_c(SiO_{4/2})_d(XO_{1/2})_e$, where $R^1$, $R^2$, and $R^3$ are independently selected from the group consisting of monovalent hydrocarbon groups and epoxy-containing organic groups, X is selected from the group consisting of hydrogen atom and alkyl group, a is a positive number, b is 0 or a positive number, c is 0 or a positive number, d is 0 or a positive number, and e is 0 or a positive number such that b/a is a number from 0 to 10, c/a is a number from 0 to 0.5, d/(a+b+c+d) is a number from 0 to 0.3, and e/(a+b+c+d) is a number from 0 to 1.

3. The curable resin composition set forth in claim 2, wherein the amount of component (II) is 0.1 to 500 parts by weight and that of component (III) is 0.15 to 200 parts by weight per 100 parts by weight of component (I).

4. The curable resin composition set forth in claim 1, wherein component (I) is a mixture of epoxy resin and phenolic resin.

5. The curable resin composition set forth in claim 1, wherein component (I) is a mixture of a biphenyl type epoxy resin and a phenol aralkyl type epoxy resin.

6. The curable resin composition set forth in claim 1, wherein not less than 10 mol % of $R^1$ in component (II) comprises phenyl groups.

7. The curable resin composition set forth in claim 6, wherein the viscosity of component (III) at 25° C. is 5 to 100,000 mPa·s.

8. The curable resin composition set forth in claim 6, wherein the amount of component (II) is 0.1 to 500 parts by weight and that of component (III) is 0.15 to 200 parts by weight per 100 parts by weight of component (I).

9. The curable resin composition set forth in claim 6, wherein component (III) is a silicone resin represented by average unit formula $(R^1SiO_{3/2})_a(R^2{}_2SiO_{2/2})_b(R^3{}_3SiO_{1/2})_c(SiO_{4/2})_d(XO_{1/2})_e$, where $R^1$, $R^2$, and $R^3$ are independently selected from the group consisting of monovalent hydrocarbon groups and epoxy-containing organic groups, X is selected from the group consisting of hydrogen atom and alkyl group, a is a positive number, b is 0 or a positive number, c is 0 or a positive number, d is 0 or a positive number, and e is 0 or a positive number such that b/a is a number from 0 to 10, c/a is a number from 0 to 0.5, d/(a+b+c+d) is a number from 0 to 0.3, and e/(a+b+c+d) is a number from 0 to 1.

10. The curable resin composition set forth in claim 1, wherein the viscosity of component (III) at 25° C. is 5 to 100,000 mPa·s.

11. The curable resin composition set forth in claim 10, wherein the amount of component (II) is 0.1 to 500 parts by weight and that of component (III) is 0.15 to 200 parts by weight per 100 parts by weight of component (I).

12. The curable resin composition set forth in claim 10, wherein component (III) is a silicone resin represented by average unit formula $(R^1SiO_{3/2})_a(R^2{}_2SiO_{2/2})_b(R^3{}_3SiO_{1/2})_c(SiO_{4/2})_d(XO_{1/2})_e$, where $R^1$, $R^2$, and $R^3$ are independently selected from the group consisting of monovalent hydrocarbon groups and epoxy-containing organic groups, X is selected from the group consisting of hydrogen atom and alkyl group, a is a positive number, b is 0 or a positive number, c is 0 or a positive number, d is 0 or a positive number, and e is 0 or a positive number such that b/a is a number from 0 to 10, c/a is a number from 0 to 0.5, d/(a+b+c+d) is a number from 0 to 0.3, and e/(a+b+c+d) is a number from 0 to 1.

13. The curable resin composition set forth in claim 1, wherein the amount of component (II) is 0.1 to 500 parts by weight and that of component (III) is 0.15 to 200 parts by weight per 100 parts by weight of component (I).

14. A cured resin obtained by curing the curable resin composition according to claim 1.

15. A cured resin obtained by curing the curable resin composition according to claim 6.

16. A cured resin obtained by curing the curable resin composition according to claim 10.

17. A cured resin obtained by curing the curable resin composition according to claim 2.

18. A cured resin obtained by curing the curable resin composition according to claim 13.

19. A curable resin composition comprising:
   (I) a mixture of a biphenyl type epoxy resin and a phenol aralkyl type epoxy resin,
   (II) a silicone resin with a softening point exceeding 25° C. represented by the average unit formula $(R^1SiO_{3/2})_a(R^2{}_2SiO_{2/2})_b(R^3{}_3SiO_{1/2})_c(SiO_{4/2})_d(XO_{1/2})_e$, wherein $R^1$, $R^2$, and $R^3$ are independently selected from the group consisting of monovalent hydrocarbon groups and epoxy-containing organic groups such that, of the total number of $R^1$, $R^2$, and groups in the molecule. 0.1 to 40 mol% comprises epoxy-containing organic groups and not less than 10 mol% comprises phenyl groups, X is selected from the group consisting of a hydrogen atom and alkyl group, a is a positive number, b is 0 or a positive number, c is 0 or a positive number, d is 0 or a positive number, and e is 0 or a positive number such that b/a is a number from 0 to 10, c/a is a number from 0 to 0.5, d/(a+b+c+d) is a number from 0 to 0.3, and e/(a+b+c+d) is a number from 0 to 0.4, and (III) a silicone resin that is liquid at 25° C.

20. The curable resin composition set forth in claim 19, wherein not less than 10 mol % of $R^1$ in component (II) comprises phenyl groups.

21. The curable resin composition set forth in claim 19, wherein component (III) is a silicone resin represented by average unit formula $(R^1SiO_{3/2})_a(R^2{}_2SiO_{2/2})_b(R^3{}_3SiO_{1/2})_c(SiO_{4/2})_d(XO_{1/2})_e$, where $R^1$, $R^2$, and $R^3$ are independently selected from the group consisting of monovalent hydrocarbon groups and epoxy-containing organic groups, X is selected from the group consisting hydrogen atom and alkyl group, a is a positive number, b is 0 or a positive number, c is 0 or a positive number, d is 0 or a positive number, and e is 0 or a positive number such that b/a is a number from 0 to 10, c/a is a number from 0 to 0.5, d/(a+b+c+d) is a number from 0 to 0.3, and e/(a+b+c+d) is a number from 0 to 1.

22. The curable resin composition set forth in claim 19, wherein the viscosity of component (III) at 25° C. is 5 to 100,000 mPa·s.

23. The curable resin composition set forth in claim 19, wherein the amount of component (II) is 0.1 to 500 parts by weight and that of component (III) is 0.15 to 200 parts by weight per 100 parts by weight of component (I).

24. A cured resin obtained by curing the curable resin composition according to claim 19.

* * * * *